United States Patent
Xiao

(10) Patent No.: US 10,949,645 B2
(45) Date of Patent: Mar. 16, 2021

(54) METHOD, APPARATUS, AND STORAGE MEDIUM FOR DATA VERIFICATION

(71) Applicant: TENCENT TECHNOLOGY (SHENZHEN) COMPANY LTD, Guangdong (CN)

(72) Inventor: Xiao Xiao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 136 days.

(21) Appl. No.: 16/376,495

(22) Filed: Apr. 5, 2019

(65) Prior Publication Data
US 2019/0236331 A1 Aug. 1, 2019

Related U.S. Application Data

(63) Continuation of application No. PCT/CN2018/079460, filed on Mar. 19, 2018.

(30) Foreign Application Priority Data

Mar. 21, 2017 (CN) .......................... 201710170866.0

(51) Int. Cl.
*G06K 9/00* (2006.01)
*G06K 9/70* (2006.01)
(Continued)

(52) U.S. Cl.
CPC ..... *G06K 9/00087* (2013.01); *G06K 9/00026* (2013.01); *G06K 9/00067* (2013.01);
(Continued)

(58) Field of Classification Search
CPC ........ G06K 9/0008; G06K 9/001; G06T 7/74; G06T 7/60
See application file for complete search history.

(56) References Cited

U.S. PATENT DOCUMENTS

| 7,539,871 B1 * | 5/2009 | Osborn | G06F 21/564 380/246 |
| 7,587,064 B2 * | 9/2009 | Owechko | G06K 9/469 382/103 |

(Continued)

FOREIGN PATENT DOCUMENTS

| CN | 101651709 A | 2/2010 |
| CN | 101854241 A | 10/2010 |

(Continued)

OTHER PUBLICATIONS

International Search Report for PCT/CN2018/079460 dated Jun. 20, 2018 (PCT/ISA/210) English translation.

*Primary Examiner* — Yosef Kassa
(74) *Attorney, Agent, or Firm* — Sughrue Mion, PLLC

(57) ABSTRACT

A data verification method is provided. Fingerprint information of N (N being an integer greater than 1) slices of to-be-sent data of a second device is received, the fingerprint information including first fingerprint information corresponding to an $i^{th}$ (i being an integer greater than 1) slice of the to-be-sent data and second fingerprint information corresponding to an $(i-1)^{th}$ slice of the to-be-sent data. The first fingerprint information is based on updating, by using the $i^{th}$ slice of the to-be-sent data, the second fingerprint information. An $i^{th}$ slice of data is received from the second device. The received second fingerprint information is updated by using the $i^{th}$ slice of data, to obtain third fingerprint information. Data verification failure indication information is transmitted to the second device in response to the third fingerprint information not matching the received first fingerprint information.

20 Claims, 13 Drawing Sheets

(51) Int. Cl.
    *H04L 9/06*    (2006.01)
    *H04L 9/32*    (2006.01)
(52) U.S. Cl.
    CPC .............. *G06K 9/70* (2013.01); *H04L 9/0643* (2013.01); *H04L 9/3239* (2013.01)

(56) References Cited

U.S. PATENT DOCUMENTS

| | | | | |
|---|---|---|---|---|
| 7,979,718 | B2* | 7/2011 | Toyama | ................ G10L 17/16 |
| | | | | 713/186 |
| 8,407,186 | B1 | 3/2013 | Cremelie et al. | |
| 8,611,618 | B2* | 12/2013 | Kwon | ................ G06K 9/00087 |
| | | | | 382/124 |
| 8,774,455 | B2* | 7/2014 | Elmenhurst | ............... G06T 7/90 |
| | | | | 382/101 |
| 9,008,698 | B2* | 4/2015 | Meredith | ............. G01S 5/0252 |
| | | | | 455/456.3 |

FOREIGN PATENT DOCUMENTS

| | | | |
|---|---|---|---|
| CN | 102064906 | A | 5/2011 |
| CN | 102882961 | A | 1/2013 |

\* cited by examiner

METHOD, APPARATUS, AND STORAGE MEDIUM FOR DATA VERIFICATION

CROSS REFERENCE TO RELATED APPLICATION(S)

This application is a continuation of International Application No. PCT/CN2018/079460, filed on Mar. 19, 2018, in the Chinese Patent Office, which claims priority to Chinese Patent Application No. 201710170866.0, entitled "DATA VERIFICATION METHOD, DATA SENDING METHOD, RELATED APPARATUS, AND SYSTEM" filed with the Chinese Patent Office on Mar. 21, 2017, the disclosures of which are incorporated in their entireties by reference.

BACKGROUND

1. Field

The exemplary embodiments of the disclosure relate to the field of computers, and in particular, to a method, an apparatus, a system, and a storage medium for data verification, data receiving, and data transmission.

2. Description of the Related Art

Cloud disks or cloud network disks are Internet storage tools. As products of Internet cloud technologies, the cloud disks provide services such as information storage, reading, and loading for enterprises and individuals through Internet, and are featured as secure, stable, and massive in storage.

With the development of electronic technologies and mobile Internet technologies, mobile electronic devices (particularly, intelligent mobile devices) have more powerful functions, and a user can do various things with the mobile electronic devices. Currently, a cloud network disk service may also provide a cloud storage function such as a file synchronization, backup, and sharing function for a mobile electronic device of a user end. Provided that the user installs a corresponding client on the mobile electronic device, the user and a server of the cloud network disk service may transmit data files to each other.

In the related art technology, a slice verification method is widely used for correctness verification in a data transmission process. That is, a data sending party sends a slice of data to a data receiving party, the data sending party first calculates a digest by using a digest algorithm and then transmits the data and the digest to the data receiving party, and then the data receiving party calculates again the received data by using the same digest algorithm for digest matching and comparison. For example, according to a verification method based on the Transmission Control Protocol (TCP) protocol, there is a checksum (a check code sum or a verification sum) field in a sent TCP header, and the correctness of the slice of data is determined through calculation, verification, and comparison.

SUMMARY

One or more exemplary embodiments provide a method, an apparatus, and a computer readable storage medium for data verification, in which a technical problem in the related art technology that a transmission error can be found only after an entire data file is downloaded is avoided, thereby avoiding fatal impact caused when a cloud network disk user uploads or downloads a large file.

According to an aspect of an exemplary embodiment, provided is a data verification method. Fingerprint information of N (N being an integer greater than 1) slices of to-be-sent data of a second device is received, the fingerprint information including first fingerprint information corresponding to an $i^{th}$ (i being an integer greater than 1) slice of the to-be-sent data and second fingerprint information corresponding to an $(i-1)^{th}$ slice of the to-be-sent data. The first fingerprint information is based on updating, by using the $i^{th}$ slice of the to-be-sent data, the second fingerprint information. An $i^{th}$ slice of data is received from the second device. The received second fingerprint information is updated by using the $i^{th}$ slice of data, to obtain third fingerprint information. Data verification failure indication information is transmitted to the second device in response to the third fingerprint information not matching the received first fingerprint information.

According to an aspect of another exemplary embodiment, provided is a data verification apparatus including: at least one memory operable to store program code; and at least one processor operable to access said at least one memory, read said program code, and operate according to said program code, said program code including: first receiving code configured to cause the at least one processor to receive, from a second device, fingerprint information of N (N being an integer greater than 1) slices of to-be-sent data of the second device, the fingerprint information including first fingerprint information corresponding to an $i^{th}$ (i being an integer greater than 1) slice of the to-be-sent data and second fingerprint information corresponding to an $(i-1)^{th}$ slice of the to-be-sent data, the first fingerprint information being based on updating, by using the $i^{th}$ slice of the to-be-sent data, the second fingerprint information; second receiving code configured to cause the at least one processor to receive an $i^{th}$ slice of data from the second device; updating code configured to cause the at least one processor to update, by using the $i^{th}$ slice of data, the received second fingerprint information, to obtain third fingerprint information; and first transmitting code configured to cause the at least one processor to transmit data verification failure indication information to the second device in response to the third fingerprint information not matching the received first fingerprint information.

According to an aspect of still another exemplary embodiment, provided is a non-transitory computer readable storage medium storing instructions, which, when executed by one or more processors, cause the one or more processors to perform: receiving fingerprint information of N (N being an integer greater than 1) slices of to-be-sent data of the second device, the fingerprint information including first fingerprint information corresponding to an $i^{th}$ (i being an integer greater than 1) slice of the to-be-sent data and second fingerprint information corresponding to an $(i-1)^{th}$ slice of the to-be-sent data, the first fingerprint information being based on updating, by using the $i^{th}$ slice of the to-be-sent data, the second fingerprint information; receiving an $i^{th}$ slice of data from the second device; updating, by the at least one processor by using the $i^{th}$ slice of data, the received second fingerprint information, to obtain third fingerprint information; and transmitting data verification failure indication information to the second device in response to the third fingerprint information not matching the received first fingerprint information.

According to an aspect of still another exemplary embodiment, provided is a data transmission method, applied to a first device and including:
slicing to-be-sent data into N slices of data;

calculating fingerprint information corresponding to each slice of data, second fingerprint information corresponding to a $j^{th}$ slice of data in the M slices of data being fingerprint information obtained by updating, by using the $j^{th}$ slice of data, third fingerprint information corresponding to a $(j-1)^{th}$ slice of data, and both M and j being integers greater than 1; and sending the fingerprint information corresponding to each slice of data to a second device.

According to an aspect of still another exemplary embodiment, provided is a data transmission apparatus, including a processor and a memory, the memory storing a computer-readable instruction that is capable of causing the processor to perform the following operations:

slicing to-be-sent data into N slices of data;

calculating fingerprint information corresponding to each slice of data, second fingerprint information corresponding to a $j^{th}$ slice of data in the M slices of data being fingerprint information obtained by updating, by using the $j^{th}$ slice of data, third fingerprint information corresponding to a $(j-1)^{th}$ slice of data, and both M and j being integers greater than 1; and sending the fingerprint information corresponding to each slice of data to a second device.

According to an aspect of still another exemplary embodiment, provided is a data transmission system, including the data sending apparatus and the data verification apparatus described above.

BRIEF DESCRIPTION OF THE DRAWINGS

To describe the technical solutions in the embodiments of the disclosure or in the related art technology more clearly, the following briefly introduces the accompanying drawings for describing the embodiments or the related art technology. Apparently, the accompanying drawings in the following description show merely some embodiments of the disclosure, and a person of ordinary skill in the art may still derive other drawings from the accompanying drawings without creative efforts.

DETAILED DESCRIPTION

Technical solutions in embodiments of the disclosure are described below with reference to the accompanying drawings in the embodiments.

Figure 1A:
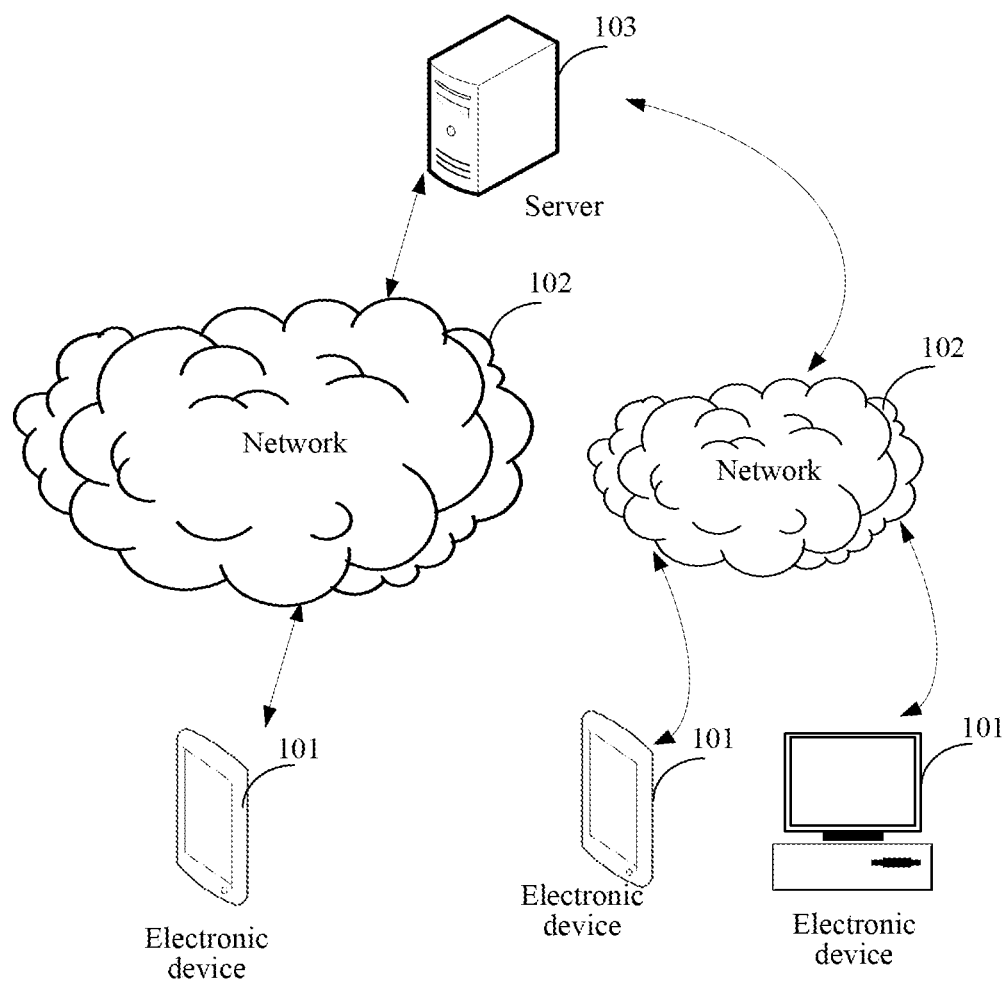
FIG. 1A is a diagram of a scenario architecture of a data verification method or a data sending method according to an embodiment.

FIG. 1A is a diagram of a scenario architecture or a system architecture of a data verification method or a data sending method according to an exemplary embodiment.

An electronic device 101 may establish a connection with a server 103 by using a network 102 for data exchange. Using a cloud network disk as an example, a user can transmit a data file to the server end 103 that provides a cloud network disk service provided that the user installs a client on the electronic device 101. For example, the user synchronizes and backs up data to the server 103, or downloads data from the server 103. When the electronic device 101 synchronizes and backs up data to the server 103, the electronic device 101 is a sending party of the data, and the server 103 is a receiving party of the data. When the electronic device 101 downloads data from the server 103, the electronic device 101 is a receiving party of the data, and the server 103 is a sending party of the data. Exemplary embodiment of a process in which the sending party sends data and the receiving party verifies the data will be described in detail with reference to FIG. 1B to FIG. 4.

It should be noted that, the electronic device 101 in an exemplary embodiment includes but is not limited to an electronic device or a terminal device such as a personal computer, an intelligent mobile terminal (such as a mobile phone, a mobile computer, or a tablet computer), a personal digital assistant (PDA), a smart television, a smartwatch, smartglasses, and a smart band.

Figure 1B:
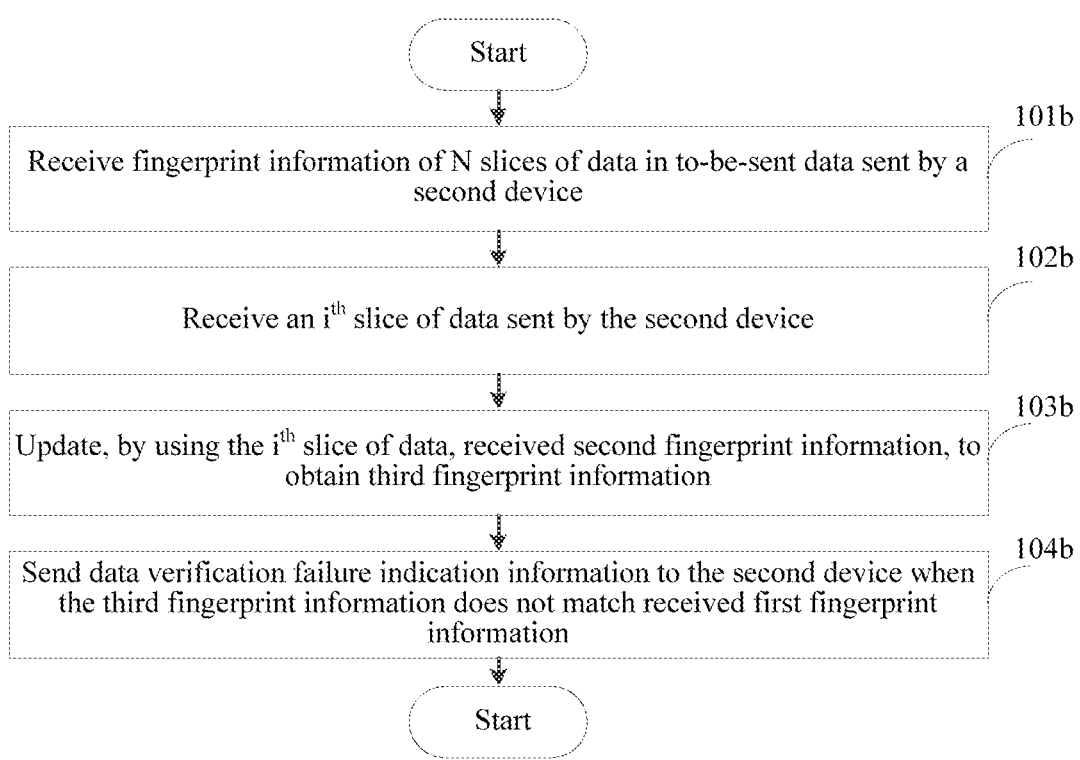
FIG. 1B is a schematic flowchart of a data transmission method according to an embodiment.

FIG. 1B is a schematic flowchart of a data verification method in the system architecture diagram according to an exemplary embodiment shown in FIG. 1A. As shown in FIG. 1B, the data verification method may be performed by a first device. The first device may be the electronic device 101 or the server 103 shown in FIG. 1A, or may be any computing device that needs to transmit data in another application scenario. The method may include the following operations:

Operation 101b: Receive fingerprint information of N slices of data in to-be-sent data sent by a second device, the N slices of data being obtained by slicing the to-be-sent data; and in the fingerprint information, first fingerprint information corresponding to an $i^{th}$ slice of data being fingerprint information obtained by updating, by using the $i^{th}$ slice of data, second fingerprint information corresponding to an $(i-1)^{th}$ slice of data, and both N and i being integers greater than 1.

Operation 102b: Receive the $i^{th}$ slice of data sent by the second device.

Operation 103b: Update, by using the $i^{th}$ slice of data, the received second fingerprint information, to obtain third fingerprint information.

Operation 104b: Send data verification failure indication information to the second device when the third fingerprint information does not match the received first fingerprint information.

In some examples, the first device may receive a first slice of data in the to-be-sent data sent by the second device, and calculate fourth fingerprint information of the first slice of data; determine whether the fourth fingerprint information matches fifth fingerprint information corresponding to the received first slice of data; and send the data verification failure indication information to the second device when the fourth fingerprint information does not match the fifth fingerprint information.

In some examples, the first device may receive sixth fingerprint information that is sent by the second device and that corresponds to the to-be-sent data; determine, by using the sixth fingerprint information, whether the to-be-sent data is stored in a database; and send data transmission indication information to the second device when determining that the to-be-sent data is not stored. Specifically, if the to-be-sent data is already stored, the fingerprint information corresponding to the to-be-sent data is also correspondingly stored. Therefore, before the first slice of data sent by the second device is received, the sixth fingerprint information corresponding to the entire to-be-sent data sent by the second device is received. If it is determined that seventh fingerprint information the same as the sixth fingerprint information is stored, it is determined that the to-be-sent data corresponding to the sixth fingerprint information is stored.

In some examples, the fingerprint information includes a message digest calculated by using a secure hash algorithm SHA, or a message digest calculated by using a message-digest algorithm MD.

In some examples, when the first device needs to send second to-be-sent data, the first device may slice the second to-be-sent data into M slices of data and calculate fingerprint information corresponding to each slice of data, where second fingerprint information corresponding to a $j^{th}$ slice of data in the M slices of data is fingerprint information obtained by updating, by using the $j^{th}$ slice of data, third fingerprint information corresponding to a $(j-1)^{th}$ slice of data, and both M and j are integers greater than 1; and send the fingerprint information corresponding to each slice of data to a third device. A value of M is determined by a size of the to-be-sent data and a used fingerprint calculation method.

In some examples, the first device may use an intermediate result of a process of calculating fingerprint information corresponding to the entire second to-be-sent data as the fingerprint information corresponding to each slice of data in the second to-be-sent data. That is, when the fingerprint information corresponding to each slice of data is calculated, the fingerprint information of the to-be-sent data may be calculated. The process of calculating the fingerprint information of the to-be-sent data may include:

calculating intermediate fingerprint information corresponding to a first slice of data in the M slices of data;

successively updating, by using the $j^{th}$ slice of data, intermediate fingerprint information corresponding to the $(j-1)^{th}$ slice of data, to obtain intermediate fingerprint information corresponding to the $j^{th}$ slice of data; and processing intermediate fingerprint information corresponding to an $M^{th}$ slice of data to obtain the fingerprint information of the second to-be-sent data.

In the foregoing process of calculating the fingerprint information of the to-be-sent data, intermediate fingerprint information corresponding to slices of data other than the $M^{th}$ slice of data is used as fingerprint information corresponding to the slices of data, and the fingerprint information corresponding to the second to-be-sent data is used as fingerprint information corresponding to the $M^{th}$ slice of data.

Figure 1C:
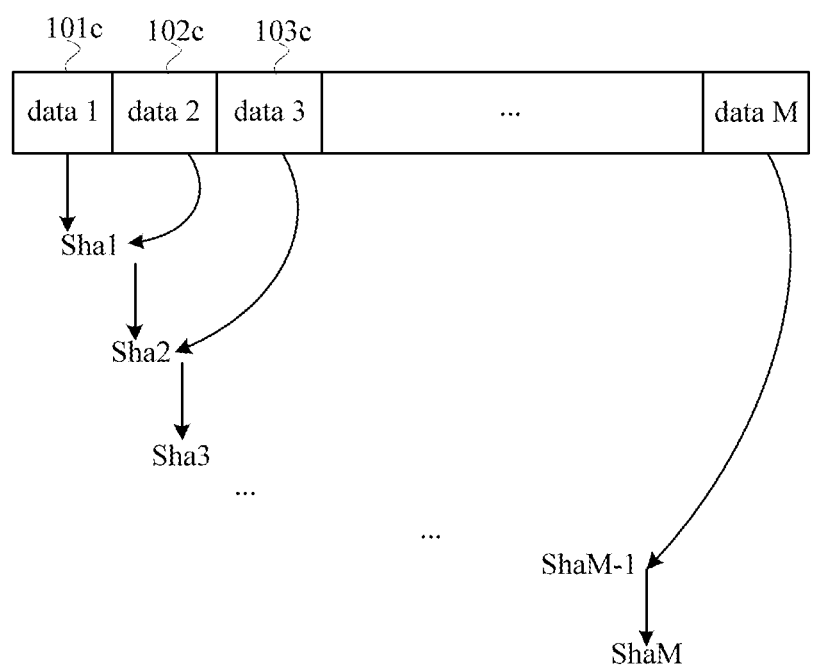
FIG. 1C is a schematic diagram of a process of calculating fingerprint information corresponding to to-be-sent data according to an embodiment.

FIG. 1C is a schematic diagram of a process of calculating the fingerprint information corresponding to the to-be-sent data. As shown in FIG. 1C, intermediate fingerprint information sha1 corresponding to a first slice of data 101c is first calculated, the intermediate fingerprint information sha1 is updated by using a second slice of data 102c to obtain intermediate fingerprint information sha2 corresponding to the second slice of data 102c, and the intermediate fingerprint information sha2 is updated by using a third slice of data 103c to obtain intermediate fingerprint information sha3 corresponding to the third slice of data 103c. According to this method, intermediate fingerprint information of each slice of data is calculated until the $M^{th}$ slice of data. It should be noted that, after intermediate fingerprint information shaM of the $M^{th}$ slice of data is obtained according to the foregoing method, the intermediate fingerprint information shaM of the $M^{th}$ slice of data is updated by using information such as a length of the to-be-sent data to obtain the fingerprint information corresponding to the entire to-be-sent data.

In some examples, data verification failure indication information sent by the third device is received, where the data verification failure indication information includes information for indicating a $k^{th}$ slice of data; and the $k^{th}$ slice of data is sent to the third device according to the data verification failure indication information.

In some examples, after data transmission indication information sent by the third device is received, the M slices of data are sent to the third device according to the data transmission indication information.

During implementation of an exemplary embodiment, fingerprint information that is of slices and that is prestored by a receiving party is verified, so that the fingerprint information of the slices of data is correlated to a sequence of the slices. Therefore, when a packet is tampered or forged or the slices are disordered, verification of a single slice of data cannot succeed, and as a result, a technical problem in the related art technology that a transmission error can be found only after an entire data file is downloaded is avoided, thereby avoiding fatal impact caused when a cloud network disk user uploads or downloads a large file. Moreover, according to an exemplary embodiment, in a case in which whether a file is uploaded within seconds needs to be determined, time consumption for calculating and verifying the fingerprint information of the entire data and a calculation amount do not increase, so that verification efficiency is effectively ensured.

Figure 2:
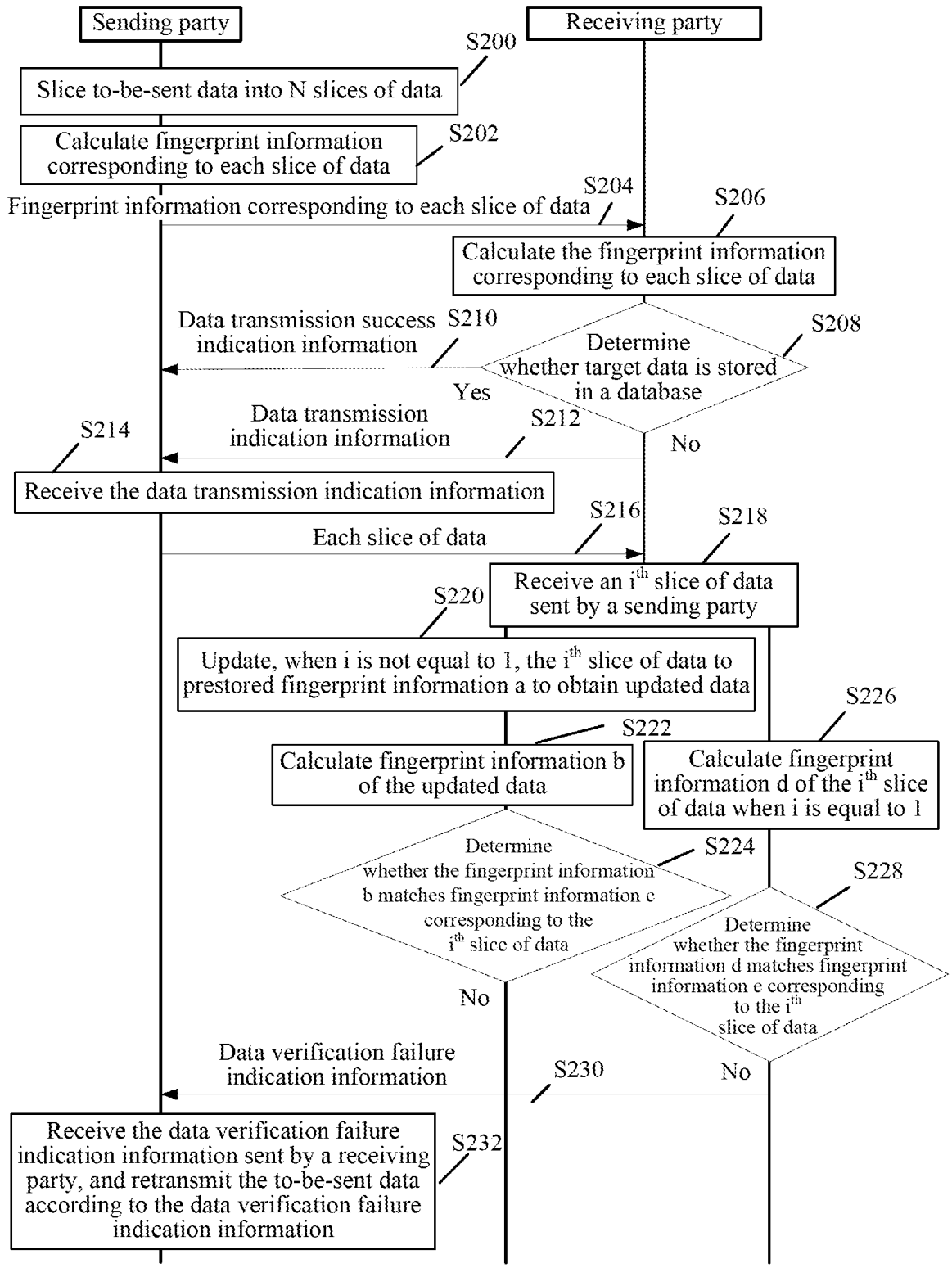
FIG. 2 is a schematic flowchart of a data transmission method according to an embodiment.

The following describes in detail the technical solutions of the data verification method and the data sending method provided in the exemplary embodiments with reference to a schematic flowchart of a data transmission method provided in an exemplary embodiment shown in FIG. 2. The technical solutions include the following operations S200 to S232:

Operation S200: A sending party slices to-be-sent data into N slices of data.

In some examples, the sending party of the data may slice large data into N slices or N blocks for transmission. For example, a size of each sliced block or slice may be defined as 512 KB. It should be noted that, the sending party may be an electronic device on a user side, or may be a server on a network side. This is not limited herein.

Operation S202: The sending party calculates fingerprint information corresponding to each slice of data.

In some example, slices of data have an order, ranging from a first slice to an $N^{th}$ slice. When fingerprint information corresponding to the first slice of data is calculated according to this embodiment, specifically, the fingerprint information may be obtained by calculating the first slice of data by using a corresponding fingerprint calculation algorithm. When fingerprint information corresponding to a $j^{th}$ slice of data is calculated, specifically, the $j^{th}$ slice of data may be updated to fingerprint information corresponding to a $(j-1)^{th}$ slice of data to obtain updated data, and then the fingerprint information is obtained by calculating the updated data by using the corresponding fingerprint calculation algorithm, j being greater than or equal to 1, and less than or equal to N−1. That is, when the fingerprint information corresponding to the $j^{th}$ slice of data is calculated, the fingerprint information may also be obtained by calculating accumulated data that is obtained after the first slice of data is accumulated to the $j^{th}$ slice of data.

Figure 3:
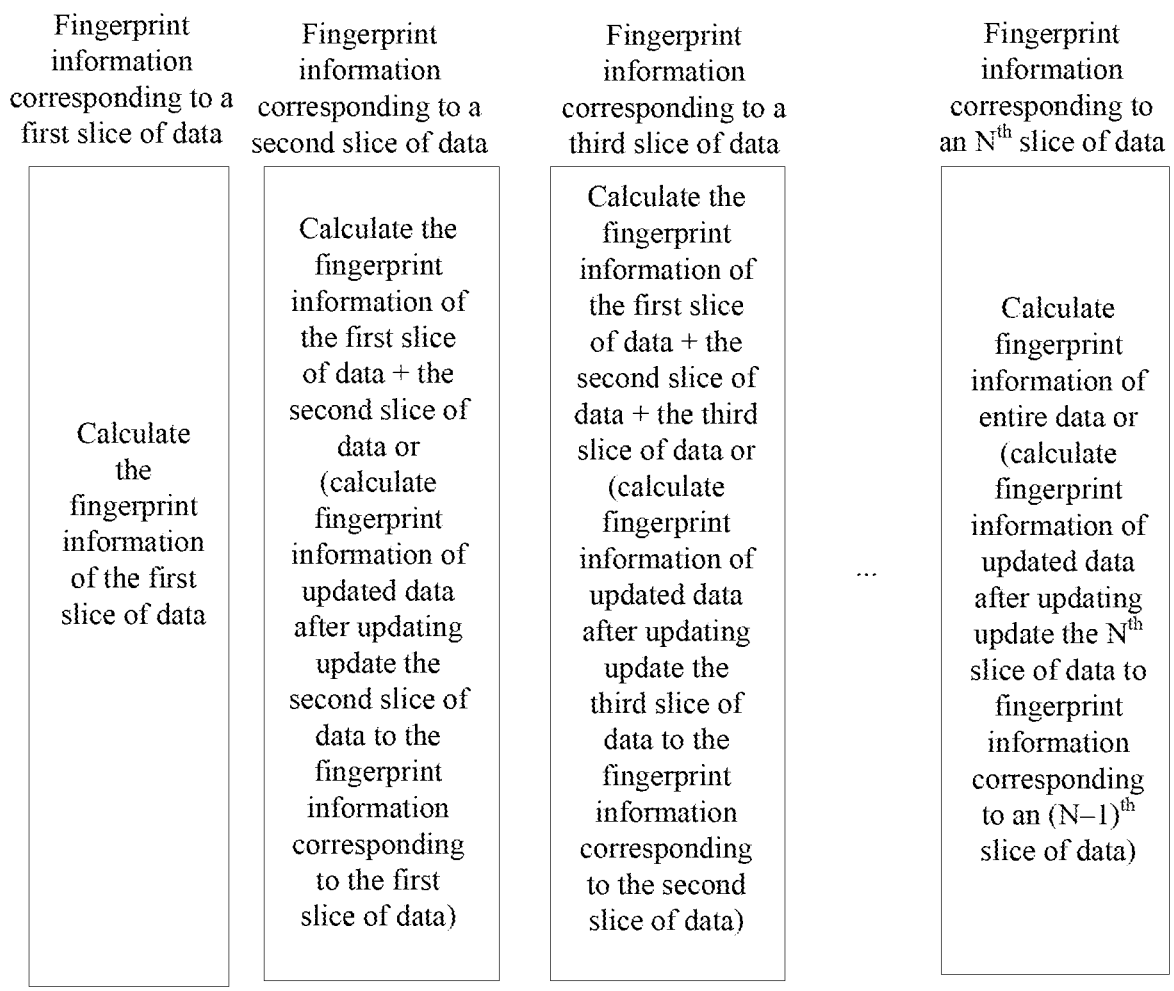
FIG. 3 is a schematic diagram of a principle of calculating fingerprint information by slices by a sending party according to an embodiment.

FIG. 3 is a schematic diagram of a principle of calculating fingerprint information by slices by a sending party according to an embodiment. For example, fingerprint information corresponding to a second slice of data is fingerprint information obtained by updating the second slice of data to fingerprint information corresponding to a first slice of data to obtain updated data, and then calculating the updated data; or fingerprint information obtained by calculating accumulated data that is obtained by adding the first slice of data to the second slice of data. For another example, fingerprint information corresponding to a tenth slice of data is fingerprint information obtained by updating the tenth slice of data to fingerprint information corresponding to a ninth slice of data to obtain updated data, and then calculating the updated data; or fingerprint information obtained by calculating accumulated data that is obtained by accumulating the first slice of data to the tenth slice of data.

Fingerprint information that corresponds to slices of data (rather than the first slice of data) and that is calculated according to the foregoing implementations is not determined only by content of separate slices of data, but is also correlated to fingerprint information of a previous slice of data, so that the fingerprint information of the slices of data is correlated to a sequence of the slices. Therefore, in a corresponding verification process according to an exemplary embodiment, a technical problem in the related art technology that when a packet is tampered or forged or the slices are disordered, verification of a single slice of data succeeds but verification of an entire data file fails, and as a result, a transmission error can be found only after the entire data file is downloaded is avoided, thereby avoiding fatal impact caused when a cloud network disk user uploads or downloads a large file.

It should be noted that, the fingerprint information in the embodiments includes but is not limited to a message digest calculated by using an SHA, or a message digest calculated by using an MD. For example, the message digest is calculated by using SHA1, or the message digest is calculated by using MD4 or MD5. However, the disclosure is not limited to this example, and any message digest that can represent feature information of data and has an update attribute (e.g., can be updated) falls within the protection scope of the fingerprint information in this embodiment.

Operation S204: Send the fingerprint information corresponding to each slice of data to a receiving party.

Operation S206: The receiving party receives the fingerprint information corresponding to each slice of data.

In some examples, after receiving the fingerprint information corresponding to each slice of data, the receiving party stores the fingerprint information corresponding to each slice of data for subsequent verification.

Operation S208: The receiving party determines, by using the fingerprint information, whether target data is stored in a database.

In some examples, the received fingerprint information corresponding to each slice of data includes fingerprint information f corresponding to entire data. For example, in an implementation of calculating the fingerprint information in operation S202, fingerprint information corresponding to a last slice of data (that is, an $N^{th}$ slice of data) is exactly the fingerprint information f corresponding to the entire data. Therefore, if it is determined, according to the fingerprint information f, that the target data is stored in the database, where fingerprint information g corresponding to the target data matches the fingerprint information f, operation S210 is performed; or if it is determined, according to the fingerprint information f, that the target data is not stored in the database, operation S212 is performed.

Operation S210: The receiving party returns data transmission success indication information to the sending party.

In some examples, if the receiving party determines, according to the fingerprint information f, that the target data is stored in the database, in other words, it indicates that the database already stores entire data to be sent by the sending party, the receiving party may return or send data transmission success indication information (or data transmission complete indication information or the like) to the sending party. The indication information is used to indicate, to the sending party, that the entire data has been successfully transmitted or transmission of the entire data completes, but, the entire data does not need to be retransmitted. This makes a user feel that the entire data is successfully transmitted within seconds.

Operation S212: The receiving party sends data transmission indication information to the sending party.

In some examples, if the receiving party determines, according to the fingerprint information f, that the target data is not stored in the database, in other words, it indicates that data to be sent by the sending party needs to be received, the data transmission indication information is used to instruct the sending party to send the data. Further, both of communication parties may negotiate with each other on transmitting data blocks by using a plurality of TCP physical links. Then, the data transmission indication information may include information such as a quantity of TCP physical links (that is, a quantity of channels), a data offset of each TCP physical link, and a size of each slice of data.

Operation S214: The sending party receives the data transmission indication information.

Operation S216: The sending party sends each slice of data to the receiving party according to the data transmission indication information.

In some examples, based on information such as the quantity of TCP physical links (the quantity of channels) in the data transmission indication information, and the data offset of each TCP physical link and the size of each slice of data, the sending party sends the slice of data to the receiving party.

Operation S218: The receiving party receives an $i^{th}$ slice of data sent by the sending party.

In some examples, when receiving a slice of data, the receiving party may verify the slice of data, wherein i is greater than or equal to 1, and less than or equal to N.

Operation S220: Update, when i is not equal to 1, the $i^{th}$ slice of data to prestored fingerprint information a, to obtain updated data.

In some examples, when the received $i^{th}$ slice of data is not a first slice of data, the receiving party updates the $i^{th}$ slice of data to the fingerprint information a, to obtain the updated data. The fingerprint information a in this embodiment may be fingerprint information corresponding to a prestored $(i-1)^{th}$ slice of data in operation S206.

Operation S222: Calculate fingerprint information b of the updated data.

In some examples, the fingerprint calculation algorithm used by the receiving party is the same as the fingerprint calculation algorithm used by the sending party in calculating the fingerprint information of the slices of data, and the fingerprint information b of the updated data is calculated by using the fingerprint calculation algorithm.

Operation S224: Determine whether the fingerprint information b matches fingerprint information c corresponding to the prestored $i^{th}$ slice of data.

In some examples, if it is determined that the fingerprint information b does not match the fingerprint information c, in other words, verification fails, operation S230 is performed. If it is determined that the fingerprint information b matches the fingerprint information c, in other words, verification succeeds, corresponding processing may be continued to be performed. For example, slices of data and the like are continued to be received. This is not limited in this embodiment.

Operation S226: Calculate fingerprint information d of the $i^{th}$ slice of data when i is equal to 1.

In some examples, when the received $i^1$ slice of data is the first slice of data, fingerprint information d of the first slice of data is directly calculated by using an algorithm that is the same as that used by the sending party in calculating the fingerprint information of the slices of data.

Operation S228: Determine whether the fingerprint information d matches prestored fingerprint information e corresponding to the $i^{th}$ slice of data.

In some examples, if it is determined that the fingerprint information d does not match the fingerprint information e, in other words, verification fails, operation S230 is performed. If it is determined that the fingerprint information d matches the fingerprint information e, in other words, verification succeeds, corresponding processing may be continued to be performed. For example, slices of data and the like are continued to be received. This is not limited in this embodiment.

Figure 4:
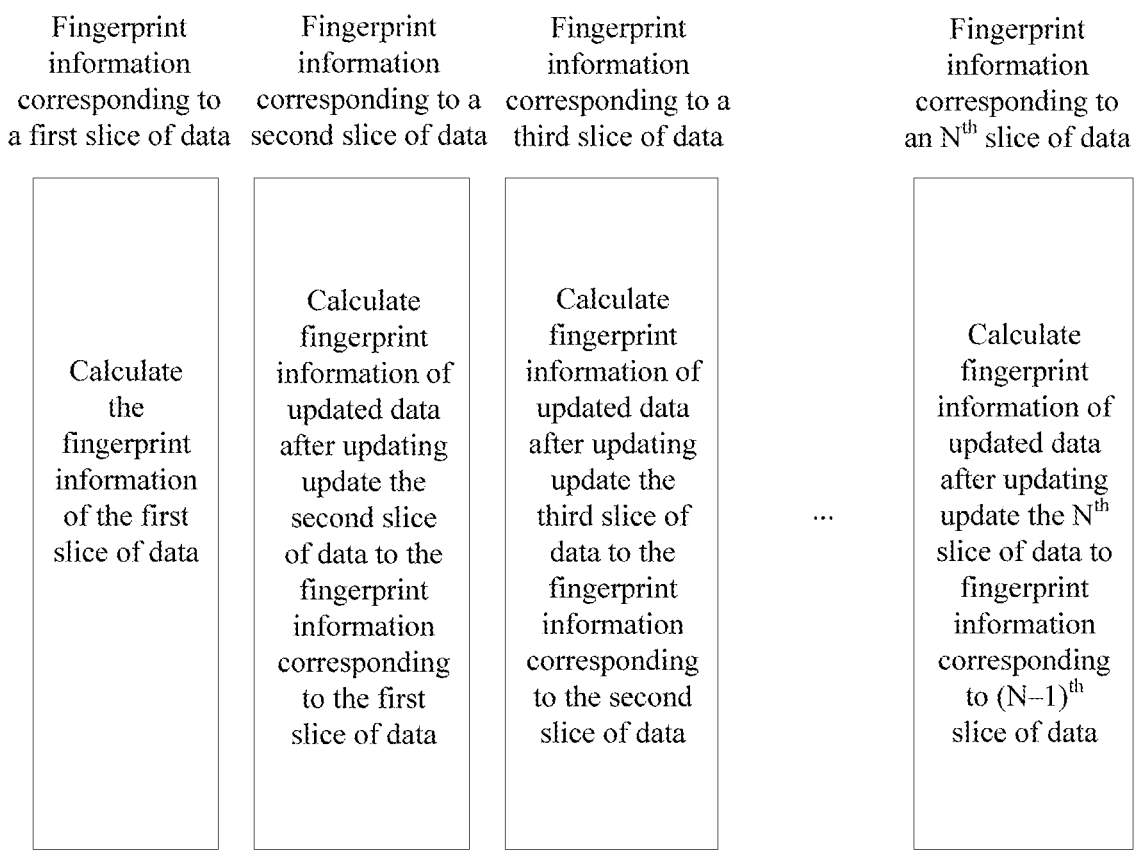
FIG. 4 is a schematic diagram of a principle of a method of verifying accumulated slices by a receiving party according to an embodiment.

It should be noted that, details of calculating, by the receiving party, fingerprint information corresponding to slices of data are shown in FIG. 4. FIG. 4 is a schematic diagram of a principle of a method of verifying accumulated slices by the receiving party according to an embodiment. For example, fingerprint information corresponding to a second slice of data is fingerprint information obtained by updating the second slice of data to fingerprint information corresponding to a first slice of data to obtain updated data, and then calculating the updated data. For another example, fingerprint information corresponding to a tenth slice of data is fingerprint information obtained by updating the tenth slice of data to fingerprint information corresponding to a ninth slice of data to obtain updated data, and then calculating the updated data.

Fingerprint information that corresponds to slices of data (rather than the first slice of data) and that is calculated according to the foregoing implementations is not determined only by content of separate slices of data, but is also correlated to fingerprint information of a previous slice of data, so that the fingerprint information of the slices of data is correlated to a sequence of the slices. In a verification process according to an exemplary embodiment, a technical problem in the related art technology that when a packet is tampered or forged or the slices are disordered, verification of a single slice of data succeeds but verification of an entire data file fails, and as a result, a transmission error can be found only after the entire data file is downloaded is avoided, thereby avoiding fatal impact caused when a cloud network disk user uploads or downloads a large file.

Operation S230: Send data verification failure indication information to the sending party.

In some examples, the data verification failure indication information is used to indicate that an error occurs during transmission performed by the sending party, and the entire data needs to be retransmitted or a slice of data corresponding to a verification error needs to be retransmitted.

Operation S232: The sending party receives the data verification failure indication information sent by the receiving party, and retransmits the to-be-sent data according to the data verification failure indication information.

In some examples, the sending party retransmits, according to content indicated by the data verification failure indication information, the entire data or the slice of data corresponding to the verification error.

During implementation of this embodiment, an $i^{th}$ slice of data sent by a sending party is received, the $i^{th}$ slice of data is updated to prestored fingerprint information a, to obtain updated data. The fingerprint information a is fingerprint information corresponding to an $(i-1)^{th}$ slice of data. Fingerprint information b of the updated data is calculated, and whether the fingerprint information b matches fingerprint information c corresponding to the prestored $i^{th}$ slice of data is determined. When the fingerprint information b does not match the fingerprint information c, data verification failure indication information is sent to the sending party. Fingerprint information of slices is accumulated for verification, so that the fingerprint information of slices of data is correlated to a sequence of the slices. Therefore, according to an exemplary embodiment, when a packet is tampered or forged or the slices are disordered, verification of a single slice of data cannot succeed, and as a result, a technical problem in the related art technology that a transmission error can be found only after an entire data file is downloaded is avoided, thereby avoiding fatal impact caused when a cloud network disk user uploads or downloads a large file. Moreover, according to an exemplary embodiment, in a case in which whether a file is uploaded within seconds needs to be determined, time consumption for calculating and verifying the fingerprint information of the entire data and a calculation amount do not increase, so that verification efficiency is effectively ensured.

For ease of better implementing the foregoing solutions in the embodiments, a data verification apparatus that performs one or more of the above described methods is provided. The data verification apparatus according to an exemplary embodiment is described in detail below with reference to the accompanying drawings.

Figure 5A:
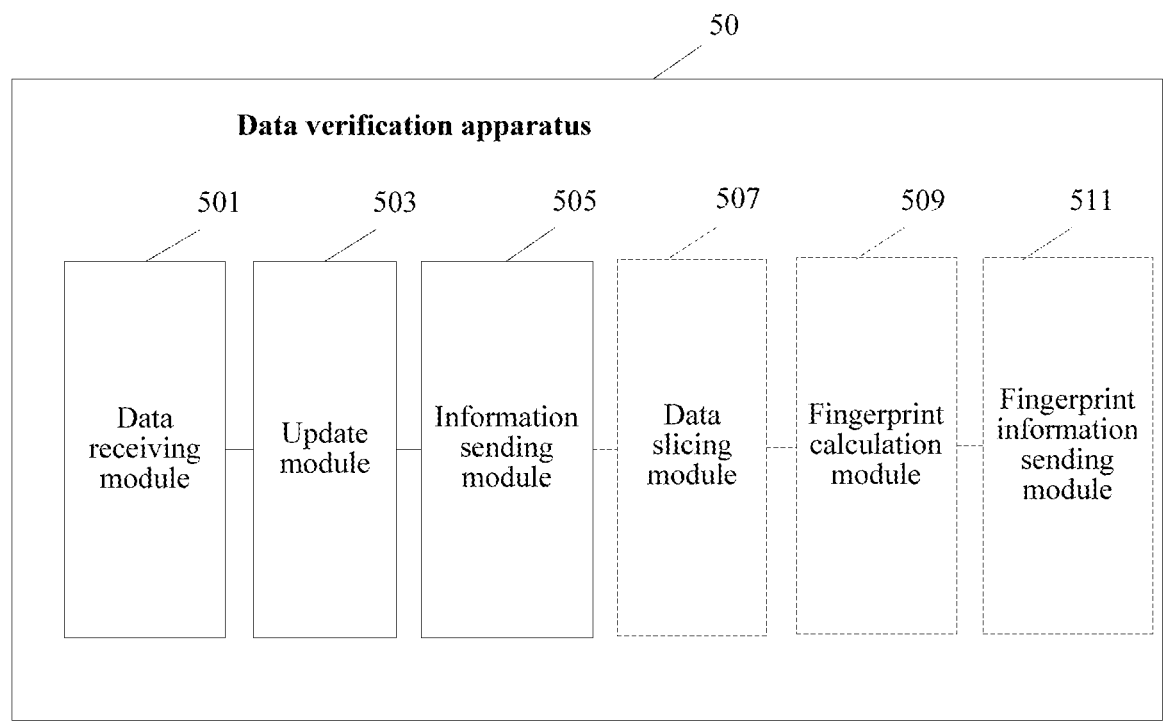
FIG. 5A is a schematic structural diagram of a data verification apparatus according to an embodiment.
Figure 5B:
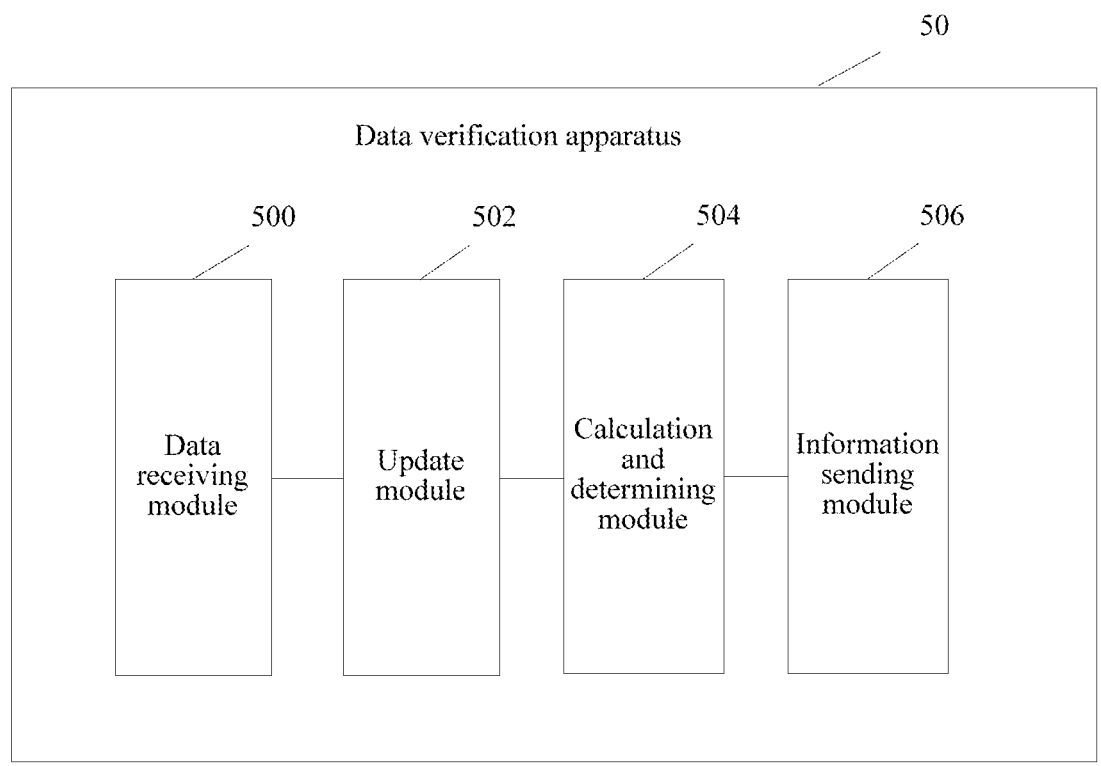
FIG. 5B is a schematic structural diagram of a data verification apparatus according to an embodiment.

FIG. 5A and FIG. 5B are schematic structural diagrams of a data verification apparatus according to an embodiment. In some examples, as shown in FIG. 5A, the data verification apparatus 50 may include:

a data receiving module 501, configured to receive fingerprint information of N slices of data in to-be-sent data sent by a second device, the N slices of data being obtained by slicing the to-be-sent data; and in the fingerprint information, first fingerprint information corresponding to an $i^{th}$ slice of data being fingerprint information obtained by updating, by using the $i^{th}$ slice of data, second fingerprint information corresponding to an $(i-1)^{th}$ slice of data, and both N and i being integers greater than 1;

the data receiving module 501 being further configured to receive the $i^{th}$ slice of data sent by the second device;

an update module 503, configured to update, by using the $i^{th}$ slice of data, the received second fingerprint information, to obtain third fingerprint information; and an information sending module 505, configured to send data verification failure indication information to the second device when the third fingerprint information does not match the received first fingerprint information.

In some examples, the data receiving module 501 is further configured to receive a first slice of data in the to-be-sent data sent by the second device, and calculate fourth fingerprint information of the first slice of data; the update module 503 is further configured to determine whether the fourth fingerprint information matches fifth fingerprint information corresponding to the received first slice of data; and the information sending module 505 is further configured to send the data verification failure indication information to the second device when the fourth fingerprint information does not match the fifth fingerprint information.

In some examples, the data receiving module 501 is further configured to receive sixth fingerprint information that is sent by the second device and that corresponds to the to-be-sent data; the update module 503 is further configured to determine, by using the sixth fingerprint information, whether the to-be-sent data is stored in a database; and the information sending module 505 is further configured to send data transmission indication information to the second device when it is determined that the to-be-sent data is not stored.

In some examples, the data verification apparatus 50 may further include a data slicing module 507, a fingerprint calculation module 509, and a fingerprint information sending module 511.

The data slicing module 507 may slice second to-be-sent data into M slices of data.

The fingerprint calculation module 509 may calculate fingerprint information corresponding to each slice of data, where second fingerprint information corresponding to a $j^{th}$ slice of data in the M slices of data is fingerprint information obtained by updating, by using the $j^{th}$ slice of data, third fingerprint information corresponding to a $(j-1)^{th}$ slice of data, and both M and j are integers greater than 1.

The fingerprint information sending module 511 may send the fingerprint information corresponding to each slice of data to a third device.

In some other examples, as shown in FIG. 5B, the data verification apparatus 50 may include a data receiving module 500, an update module 502, a calculation and determining module 504, and an information sending module 506.

The data receiving module 500 is configured to receive an $i^{th}$ slice of data sent by a sending party, where the sending party slices to-be-sent data into N slices of data for sending, and i is greater than or equal to 1 and less than or equal to N.

The update module 502 is configured to update, when i is not equal to 1, the $i^{th}$ slice of data to prestored fingerprint information a to obtain updated data, where the fingerprint information a is fingerprint information corresponding to an $(i-1)^{th}$ slice of data.

The calculation and determining module 504 is configured to: calculate fingerprint information b of the updated data, and determine whether the fingerprint information b matches fingerprint information c corresponding to the pre-stored $i^{th}$ slice of data.

The information sending module 506 is configured to send data verification failure indication information to the sending party when the fingerprint information b does not match the fingerprint information c.

In some examples, the calculation and determining module 504 is further configured to: calculate, when i is equal to 1, fingerprint information d of the $i^{th}$ slice of data; and determine whether the fingerprint information d matches fingerprint information e corresponding to the $i^{th}$ slice of data.

The information sending module 506 is further configured to send the data verification failure indication information to the sending party when the fingerprint information d does not match the fingerprint information e.

Figure 6:
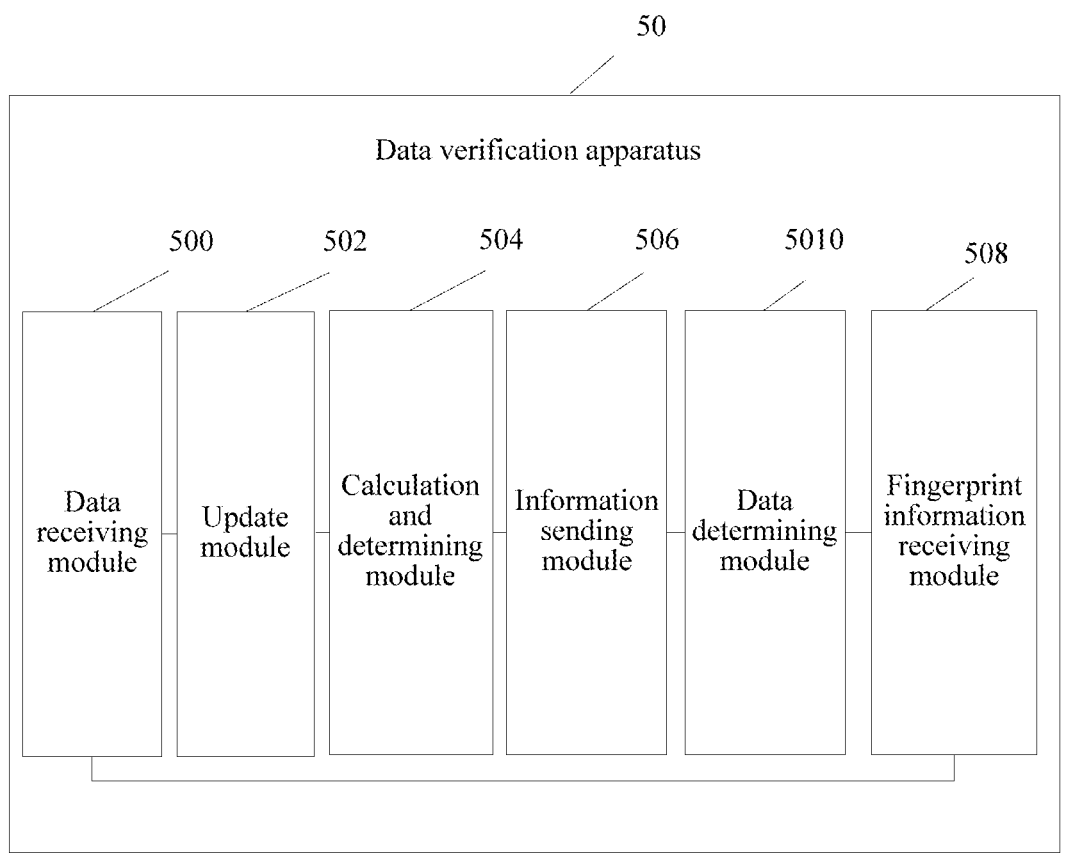
FIG. 6 is a schematic structural diagram of a data verification apparatus according to another exemplary embodiment.

FIG. 6 is a schematic structural diagram of a data verification apparatus according to another exemplary embodiment. The data verification apparatus 50 may include a data receiving module 500, an update module 502, a calculation and determining module 504, and an information sending module 506, and may further include a fingerprint information receiving module 508 and a data determining module 5010.

The fingerprint information receiving module 508 is configured to receive fingerprint information f that is sent by a sending party and that corresponds to the to-be-sent data, before the data receiving module 500 receives an $i^{th}$ slice of data sent by the sending party.

The data determine module 5010 is configured to determine, by using the fingerprint information f, whether target data is stored in a database, where fingerprint information g corresponding to the target data matches the fingerprint information f.

The information sending module 506 is further configured to send data transmission indication information to the sending party when it is determined that the target data is not stored.

In some examples, the fingerprint information in this embodiment includes a message digest calculated by using an SHA, or a message digest calculated by using an MD.

Figure 7:
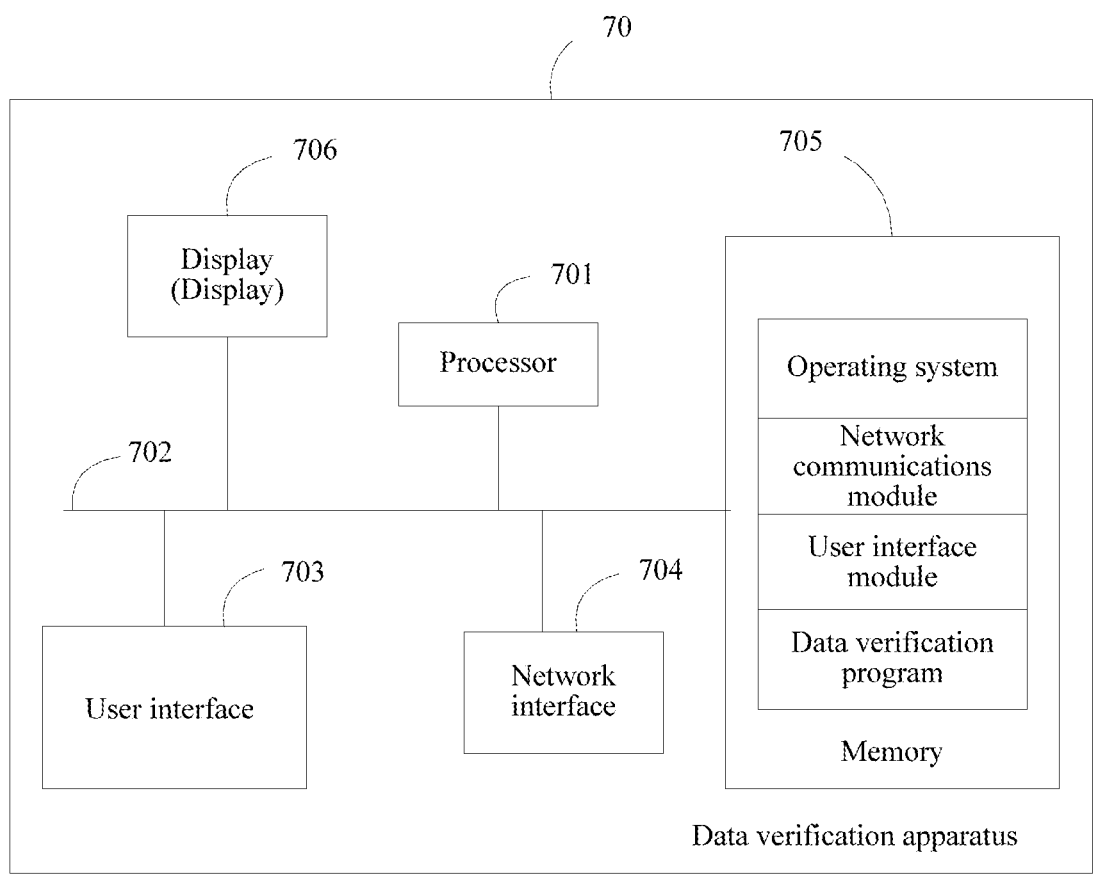
FIG. 7 is a schematic structural diagram of a data verification apparatus according to another exemplary embodiment.

FIG. 7 is a schematic structural diagram of a data verification apparatus according to another exemplary embodiment. The data verification apparatus 70 may include at least one processor 701, for example, a CPU, at least one network interface 704, a user interface 703, a memory 705, at least one communications bus 702, and a display 706. The communications bus 702 is configured to implement connection communication between the components. The user interface 703 may include a touchscreen, and the like. Optionally, the network interface 704 may include a standard wired interface and a standard wireless interface (such as a Wi-Fi interface). The memory 705 may be a high-speed RAM memory, or may be a non-volatile memory, for example, at least one magnetic disk memory. The memory 705 includes a flash in this embodiment. Optionally, the memory 705 may be at least one storage system located remotely from the foregoing processor 701. As shown in FIG. 7, the memory 705, a computer storage medium, may include an operating system, a network communications module, a user interface module, and a data verification program.

In the data verification apparatus 70 shown in FIG. 7, the processor 701 may be configured to: invoke the data verification program stored in the memory 705, and perform processing operations in the embodiments when a computing device receives data. For example, the processor 701 is capable of:

receiving, by using the network interface 704, an $i^{th}$ slice of data sent by a sending party, where the sending party slices to-be-sent data into N slices of data for sending; and i is greater than or equal to 1, and less than or equal to N;

updating, when i is not equal to 1, the $i^{th}$ slice of data to prestored fingerprint information a to obtain updated data, where the fingerprint information a is fingerprint information corresponding to an $(i-1)^{th}$ slice of data;

calculating fingerprint information b of the updated data, and determining whether the fingerprint information b matches fingerprint information c corresponding to the prestored $i^{th}$ slice of data; and sending data verification failure indication information to the sending party by using the network interface 704 when the fingerprint information b does not match the fingerprint information c.

In some examples, after receiving, by using the network interface 704, the $i^{th}$ slice of data sent by the sending party, the processor 701 is further capable of:

calculating fingerprint information d of the $i^{th}$ slice of data when i is equal to 1:

determining whether the fingerprint information d matches prestored fingerprint information e corresponding to the $i^{th}$ slice of data; and sending data verification failure indication information to the sending party by using the network interface 704 when the fingerprint information d does not match the fingerprint information e.

In some examples, before receiving, by using the network interface 704, the $i^{th}$ slice of data sent by the sending party, the processor 701 is further capable of performing the following operations:

receiving, by using the network interface 704, fingerprint information f that is sent by the sending party and that corresponds to the to-be-sent data;

determining, by using the fingerprint information f, whether target data is stored in a database, where fingerprint information g corresponding to the target data matches the fingerprint information f; and sending data transmission indication information to the sending party by using the network interface 704 when determining that the target data is not stored.

In some examples, the fingerprint information includes a message digest calculated by using an SHA, or a message digest calculated by using an MD.

It should be noted that, for functions of the modules in the data verification apparatus 50 or the data verification apparatus 70 in the embodiments, refer to a specific implementation of any embodiment of FIG. 2 to FIG. 4 in the foregoing method embodiments, and details are not repeatedly described. The data verification apparatus 50 or the data verification apparatus 70 may include, but not limited to, an electronic device or a terminal device such as a personal computer, and an intelligent mobile terminal (such as a mobile phone, a mobile computer, or a tablet computer).

Figure 8:
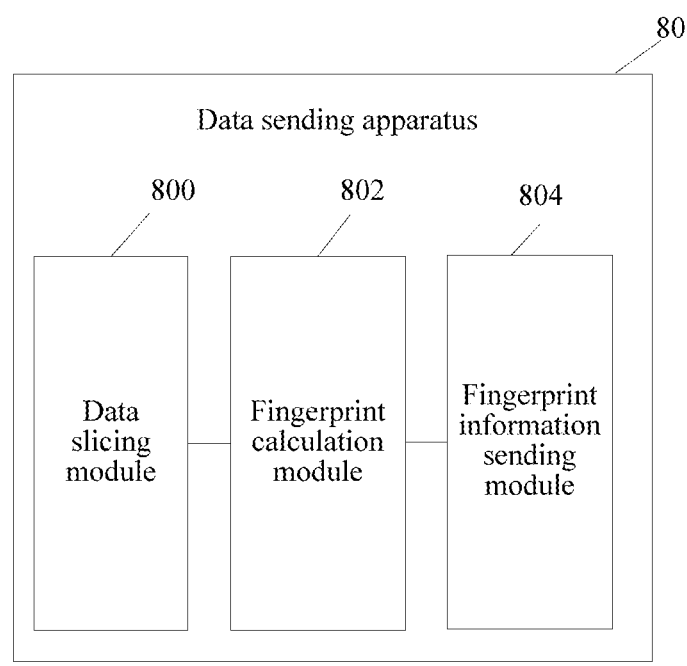
FIG. 8 is a schematic structural diagram of a data sending apparatus according to an embodiment.

For ease of better implementing the foregoing solutions in the embodiments, the disclosure may further correspondingly provide a data sending apparatus, which is described in detail below with reference to the accompanying drawings:

FIG. 8 is a schematic structural diagram of a data sending apparatus according to another exemplary embodiment. The data sending apparatus 80 may include a data slicing module 800, a fingerprint calculation module 802, and a fingerprint information sending module 804.

The data slicing module 800 is configured to slice to-be-sent data into N slices of data.

The fingerprint calculation module 802 is configured to calculate fingerprint information corresponding to each slice of data, where fingerprint information corresponding to a first slice of data is fingerprint information obtained by calculating the first slice of data; fingerprint information corresponding to a $j^{th}$ slice of data is fingerprint information obtained by calculating updated data; and the updated data is data obtained after updating the $j^{th}$ slice of data to fingerprint information corresponding to a $(j-1)^{th}$ slice of data, where j is greater than or equal to 1, and less than or equal to N-1.

The fingerprint information sending module 804 is configured to send the fingerprint information corresponding to each slice of data to a receiving party.

Figure 9:
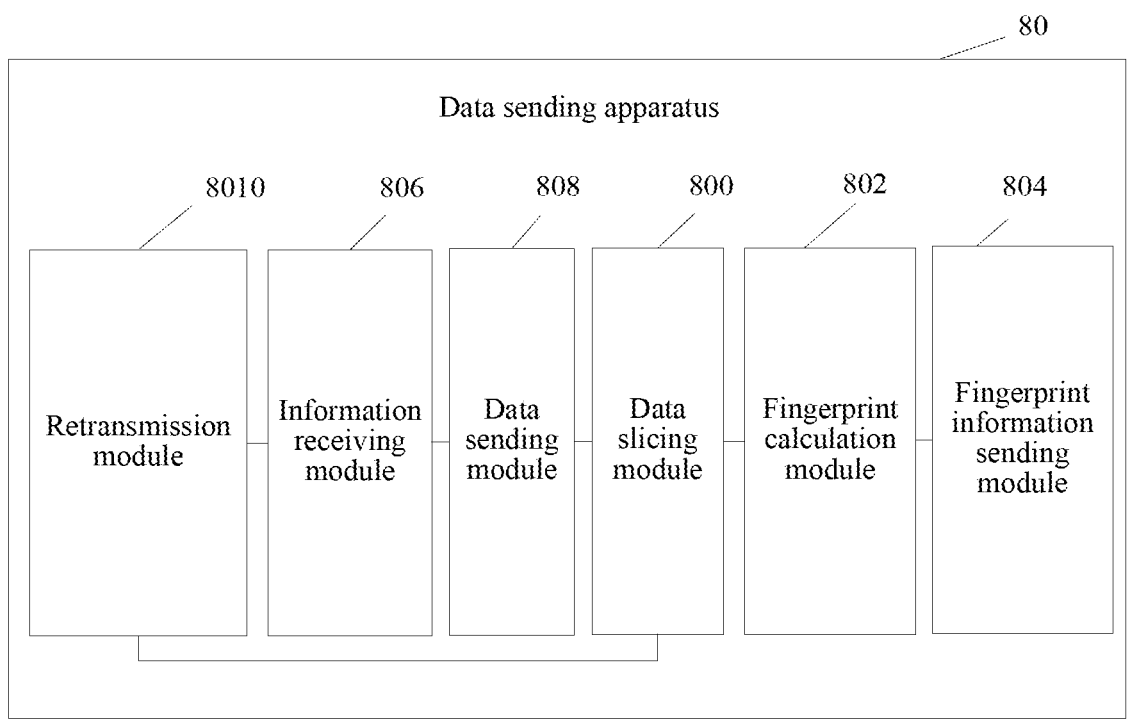
FIG. 9 is a schematic structural diagram of a data sending apparatus according to another exemplary embodiment.

In some examples, FIG. 9 is a schematic structural diagram of a data sending apparatus according to another exemplary embodiment. The data sending apparatus 80 includes a data slicing module 800, a fingerprint calculation module 802, and a fingerprint information sending module 804, and may further include an information receiving module 806, a data sending module 808, and a retransmission module 8010.

The information receiving module 806 is configured to receive data transmission indication information sent by a receiving party, after the fingerprint information sending module 804 sends fingerprint information corresponding to each slice of data to the receiving party.

The data sending module 808 is configured to send each slice of data to the receiving party according to the data transmission indication information.

Further, the information receiving module 806 is further configured to receive data verification failure indication information sent by the receiving party, after the data sending module 808 sends each slice of data to the receiving party.

The retransmission module 8010 is configured to retransmit the to-be-sent data according to the data verification failure indication information.

Figure 10:
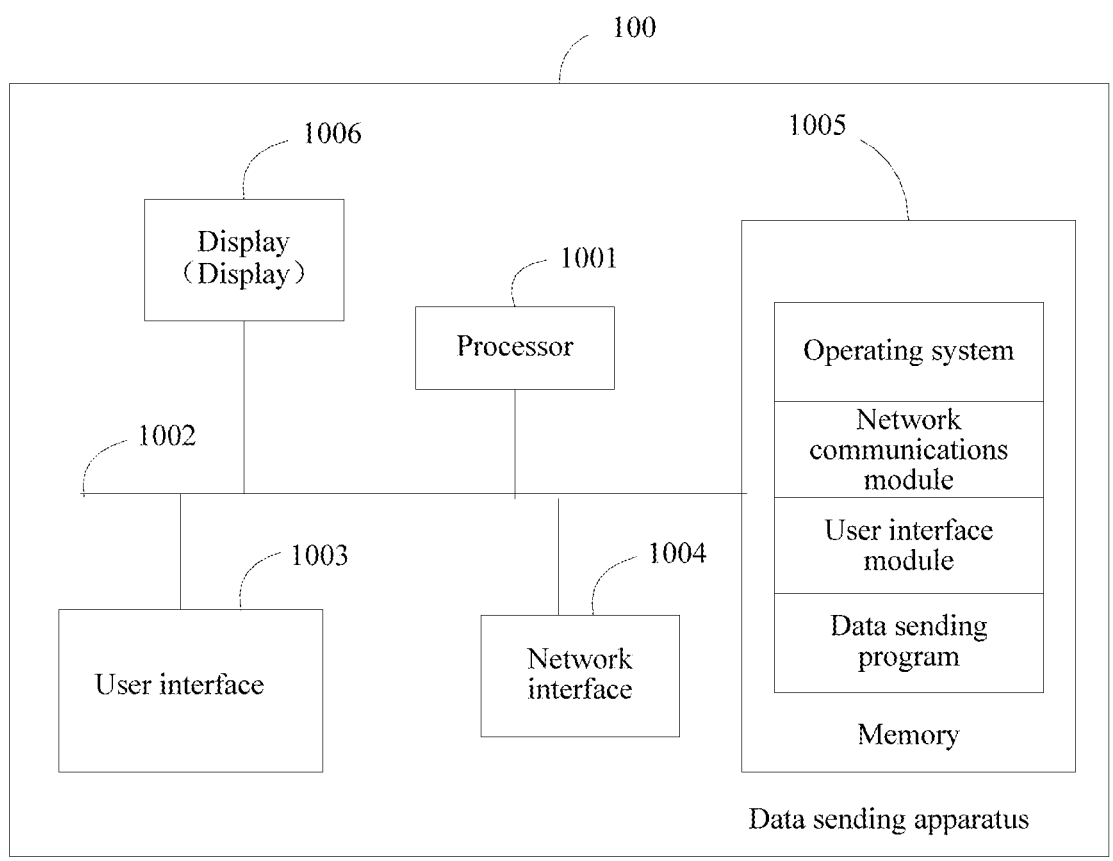
FIG. 10 is a schematic structural diagram of a data sending apparatus according to another exemplary embodiment.

FIG. 10 is a schematic structural diagram of a data sending apparatus according to another exemplary embodiment. The data sending apparatus 100 may include at least one processor 1001, for example, a CPU, at least one network interface 1004, a user interface 1003, a memory 1005, at least one communications bus 1002, and a display 1006. The communications bus 1002 is configured to implement connection communication between the components. The user interface 1003 may include a touchscreen, and the like. Optionally, the network interface 1004 may include a standard wired interface and a standard wireless interface (such as a Wi-Fi interface). The memory 1005 may be a high-speed RAM memory, or may be a non-volatile memory, for example, at least one magnetic disk memory. The memory 1005 includes a flash in this embodiment. Optionally, the memory 1005 may be at least one storage system located remotely from the foregoing processor 1001. As shown in FIG. 10, the memory 1005, a computer storage medium, may include an operating system, a network communications module, a user interface, and a data sending program.

In the data sending apparatus 100 shown in FIG. 10, the processor 1001 may be configured to: invoke the data sending program stored in the memory 1005, and perform processing operations in the embodiments when a computing device sends data. For example, the processor 1001 is capable of:

slicing to-be-sent data into N slices of data;

calculating fingerprint information corresponding to each slice of data, where fingerprint information corresponding to a first slice of data is fingerprint information obtained by calculating the first slice of data; fingerprint information corresponding to a $j^{th}$ slice of data is fingerprint information obtained by calculating updated data; and the updated data is data obtained after updating the $j^{th}$ slice of data to fingerprint information corresponding to a $(j-1)^{th}$ slice of data, where j is greater than or equal to 1, and less than or equal to N−1; and sending the fingerprint information corresponding to each slice of data to the receiving party by using the network interface 1004.

In some examples, when a memory in an apparatus stores both the data verification program shown in FIG. 7 and the data sending program shown in FIG. 10, the apparatus has the functions of both the data verification apparatus shown in FIG. 7 and the data sending apparatus shown in FIG. 10.

In some examples, after sending the fingerprint information corresponding to each slice of data to the receiving party by using the network interface 1004, the processor 1001 may further be capable of performing the following operation:

sending each slice of data to the receiving party by using the network interface 1004 according to data transmission indication information, after receiving the data transmission indication information sent by the receiving party by using the network interface 1004.

In some examples, after sending each slice of data to the receiving party by using the network interface 1004, the processor 1001 may further be capable of performing the following operations:

receiving data verification failure indication information sent by the receiving party by using the network interface 1004; and retransmitting the to-be-sent data by using the network interface 1004 according to the data verification failure indication information.

It should be noted that, for functions of the modules in the data sending apparatus 80 or the data sending apparatus 100 in the embodiments, refer to a specific implementation of any embodiment of FIG. 2 to FIG. 4 in the foregoing method embodiments, and details are not repeatedly described. The data sending apparatus 80 or the data sending apparatus 100 may include, but not limited to, an electronic device or a terminal device such as a personal computer, and an intelligent mobile terminal (such as a mobile phone, a mobile computer, or a tablet computer).

For ease of better implementing the solutions in the embodiments, the disclosure may correspondingly provide a data transmission system. The data transmission system may include the data verification apparatus in FIG. 5 to FIG. 7, and the data sending apparatus in FIG. 8 to FIG. 10. For details as to how the data transmission system transmits data, refer to a specific implementation of any embodiment of FIG. 2 to FIG. 4 in the method embodiments, and details are not repeatedly described.

During implementation of this embodiment, an $i^{th}$ slice of data sent by a sending party is received, the $i^{th}$ slice of data is updated to prestored fingerprint information a, to obtain updated data. The fingerprint information a is fingerprint information corresponding to an $(i-1)^{th}$ slice of data. Fingerprint information b of the updated data is calculated, and whether the fingerprint information b matches fingerprint information c corresponding to the prestored $i^{th}$ slice of data is determined. When the fingerprint information b does not match the fingerprint information c, data verification failure indication information is sent to the sending party. Fingerprint information of slices is accumulated for verification, so that the fingerprint information of slices of data is correlated to a sequence of the slices. Therefore, according to an exemplary embodiment, when a packet is tampered or forged or the slices are disordered, verification of a single slice of data cannot succeed, and as a result, a technical problem in the related art technology that a transmission error can be found only after an entire data file is downloaded is avoided, thereby avoiding fatal impact caused when a cloud network disk user uploads or downloads a large file. Moreover, according to this embodiment, in a case in which whether a file is uploaded within seconds needs to be determined, time consumption for calculating and verifying the fingerprint information of the entire data and a calculation amount do not increase, so that verification efficiency is effectively ensured.

A person of ordinary skill in the art may understand that all or some of the processes of the methods in the exemplary embodiments may be implemented by a computer program instructing relevant hardware. The program may be stored in a computer readable storage medium. When the program is run, the processes of the embodiments of the foregoing methods may be included. The foregoing storage medium may be a magnetic disk, an optical disc, a read-only memory (ROM), or a random access memory (RAM).

At least one of the components, elements, modules or units described herein may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in some of block diagrams, communication between the components, elements or units may be performed through the bus. Functional aspects of the above exemplary embodiments may be implemented in algorithms that execute on one or more processors. Furthermore, the components, elements or units represented by a block or processing operations may employ any number of related art techniques for electronics configuration, signal processing and/or control, data processing and the like.

The foregoing embodiments are merely intended for describing the technical solutions, but not for limiting the disclosure. Although the disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments.

What is claimed is:

1. A data verification method performed by at least one processor of a first device, the method comprising:
receiving, by the at least one processor from a second device, fingerprint information of N (N being an integer greater than 1) slices of to-be-sent data of the second device, the fingerprint information comprising first fingerprint information corresponding to an $i^{th}$ (i being an integer greater than 1) slice of the to-be-sent data and second fingerprint information corresponding to an $(i-1)^{th}$ slice of the to-be-sent data, the first fingerprint information being based on updating, by using the $i^{th}$ slice of the to-be-sent data, the second fingerprint information;
receiving, by the at least one processor, an $i^{th}$ slice of data from the second device;
updating, by the at least one processor by using the $i^{th}$ slice of data, the received second fingerprint information, to obtain third fingerprint information; and
transmitting, by the at least one processor, data verification failure indication information to the second device in response to the third fingerprint information not matching the received first fingerprint information.

2. The method according to claim 1, further comprising:
receiving, from the second device, a first slice of the to-be-sent data, and obtaining fourth fingerprint information of the first slice of the to-be-sent data;
determining whether the fourth fingerprint information matches fifth fingerprint information corresponding to the received first slice of the to-be-sent data; and
transmitting the data verification failure indication information to the second device in response to the fourth fingerprint information not matching the fifth fingerprint information.

3. The method according to claim 2, further comprising:
receiving, from the second device, sixth fingerprint information that corresponds to the to-be-sent data;
determining, by using the sixth fingerprint information, whether the to-be-sent data is stored in a database; and
transmitting data transmission indication information to the second device in response to determining that the to-be-sent data is not stored.

4. The method according to claim 1, wherein the fingerprint information comprises a message digest obtained by using a secure hash algorithm SHA, or a message digest obtained by using a message-digest algorithm MD.

5. The method according to claim 1, further comprising:
slicing second to-be-sent data into M (M being an integer greater than 1) slices of to-be-sent data;
obtaining fingerprint information corresponding to each of the M slices of to-be-sent data, wherein seventh fingerprint information corresponding to a $j^{th}$ (j being an integer greater than 1) slice of to-be-sent data in the M slices of to-be-sent data is based on updating, by using the $j^{th}$ slice of to-be-sent data, eighth fingerprint information corresponding to a $(j-1)^{th}$ slice of to-be-sent data; and
transmitting the fingerprint information corresponding to each slice of data to a third device.

6. The method according to claim 5, wherein the obtaining the fingerprint information corresponding to each of the M slices of data comprises:
obtaining fingerprint information of the second to-be-sent data by performing:
obtaining fingerprint information corresponding to a first slice of data in the M slices of to-be-sent data;
successively updating, by using the $j^{th}$ slice of data, fingerprint information corresponding to the $(j-1)^{th}$ slice of data, to obtain fingerprint information corresponding to the $j^{th}$ slice of data;
updating fingerprint information corresponding to an $M^{th}$ slice of data to obtain the fingerprint information of the second to-be-sent data.

7. The method according to claim 5, further comprising:
receiving, from the third device, the data verification failure indication information that relates to a $k^{th}$ slice of data; and
transmitting the $k^{th}$ slice of data to the third device based on the data verification failure indication information.

8. The method according to claim 5, further comprising:
transmitting the M slices of data to the third device in response to receiving data transmission indication information from the third device.

9. A data verification apparatus comprising:
at least one memory operable to store program code; and
at least one processor operable to access said at least one memory, read said program code, and operate according to said program code, said program code comprising:
first receiving code configured to cause the at least one processor to receive, from a second device, fingerprint information of N (N being an integer greater than 1) slices of to-be-sent data of the second device, the fingerprint information comprising first fingerprint information corresponding to an $i^{th}$ (i being an integer greater than 1) slice of the to-be-sent data and second fingerprint information corresponding to an $(i-1)^{th}$ slice of the to-be-sent data, the first fingerprint information being based on updating, by using the $i^{th}$ slice of the to-be-sent data, the second fingerprint information;
second receiving code configured to cause the at least one processor to receive an $i^{th}$ slice of data from the second device;
updating code configured to cause the at least one processor to update, by using the $i^{th}$ slice of data, the received second fingerprint information, to obtain third fingerprint information; and
first transmitting code configured to cause the at least one processor to transmit data verification failure indication information to the second device in response to the third fingerprint information not matching the received first fingerprint information.

10. The apparatus according to claim 9, wherein the program code further comprises:
third receiving code configured to cause the at least one processor to receive, from the second device, a first slice of the to-be-sent data, and obtain fourth fingerprint information of the first slice of the to-be-sent data;
first determining code configured to cause the at least one processor to determine whether the fourth fingerprint information matches fifth fingerprint information corresponding to the received first slice of the to-be-sent data; and
second transmitting code configured to cause the at least one processor to transmit the data verification failure indication information to the second device in response to the fourth fingerprint information not matching the fifth fingerprint information.

11. The apparatus according to claim 10, wherein the program code further comprises:

fourth receiving code configured to cause the at least one processor to receive, from the second device, sixth fingerprint information that corresponds to the to-be-sent data;

second determining code configured to cause the at least one processor to determine, by using the sixth fingerprint information, whether the to-be-sent data is stored in a database; and third transmitting code configured to cause the at least one processor to transmit data transmission indication information to the second device in response to determining that the to-be-sent data is not stored.

12. The apparatus according to claim 9, wherein the fingerprint information comprises a message digest obtained by using a secure hash algorithm SHA, or a message digest obtained by using a message-digest algorithm MD.

13. The apparatus according to claim 9, wherein the program code further comprises:

slicing code configured to cause the at least one processor to slice second to-be-sent data into M (M being an integer greater than 1) slices of to-be-sent data;

obtaining code configured to cause the at least one processor to obtain fingerprint information corresponding to each of the M slices of to-be-sent data, wherein seventh fingerprint information corresponding to a $j^{th}$ (j being an integer greater than 1) slice of to-be-sent data in the M slices of to-be-sent data is based on updating, by using the $j^{th}$ slice of to-be-sent data, eighth fingerprint information corresponding to a $(j-1)^{th}$ slice of to-be-sent data; and fourth transmitting code configured to cause the at least one processor to transmit the fingerprint information corresponding to each slice of data to a third device.

14. The apparatus according to claim 13, wherein the obtaining code further causes the at least one processor to obtain fingerprint information of the second to-be-sent data by performing:

obtaining fingerprint information corresponding to a first slice of data in the M slices of to-be-sent data;

successively updating, by using the $j^{th}$ slice of data, fingerprint information corresponding to the $(j-1)^{th}$ slice of data, to obtain fingerprint information corresponding to the $j^{th}$ slice of data;

updating fingerprint information corresponding to an $M^{th}$ slice of data to obtain the fingerprint information of the second to-be-sent data.

15. The apparatus according to claim 13, wherein the program code further comprises:

fifth receiving code configured to cause the at least one processor to receive, from the third device, the data verification failure indication information that relates to a $k^{th}$ slice of data; and fourth transmitting code configured to cause the at least one processor to transmit the $k^{th}$ slice of data to the third device based on the data verification failure indication information.

16. The apparatus according to claim 13, wherein the program code further comprises:

fifth transmitting code configured to cause the at least one processor to transmit the M slices of data to the third device in response to receiving data transmission indication information from the third device.

17. A non-transitory computer readable storage medium storing instructions, which, when executed by one or more processors, cause the one or more processors to perform:

receiving, from a second device, fingerprint information of N (N being an integer greater than 1) slices of to-be-sent data of the second device, the fingerprint information comprising first fingerprint information corresponding to an $i^{th}$ (i being an integer greater than 1) slice of the to-be-sent data and second fingerprint information corresponding to an $(i-1)^{th}$ slice of the to-be-sent data, the first fingerprint information being based on updating, by using the $i^{th}$ slice of the to-be-sent data, the second fingerprint information;

receiving an $i^{th}$ slice of data from the second device;

updating, by using the $i^{th}$ slice of data, the received second fingerprint information, to obtain third fingerprint information; and transmitting data verification failure indication information to the second device in response to the third fingerprint information not matching the received first fingerprint information.

18. The non-transitory computer readable storage medium according to claim 17, wherein the instructions further cause the one or more processors to perform:

receiving, from the second device, a first slice of the to-be-sent data, and obtaining fourth fingerprint information of the first slice of the to-be-sent data;

determining whether the fourth fingerprint information matches fifth fingerprint information corresponding to the received first slice of the to-be-sent data; and transmitting the data verification failure indication information to the second device in response to the fourth fingerprint information not matching the fifth fingerprint information.

19. The method according to claim 18, wherein the instructions further cause the one or more processors to perform:

receiving, from the second device, sixth fingerprint information that corresponds to the to-be-sent data;

determining, by using the sixth fingerprint information, whether the to-be-sent data is stored in a database; and transmitting data transmission indication information to the second device in response to determining that the to-be-sent data is not stored.

20. The method according to claim 17, wherein the fingerprint information comprises a message digest obtained by using a secure hash algorithm SHA, or a message digest obtained by using a message-digest algorithm MD.

* * * * *